United States Patent [19]

Kikuchi

[11] Patent Number: 4,712,133
[45] Date of Patent: Dec. 8, 1987

[54] ENDOSCOPIC APPARATUS

[75] Inventor: Katsuya Kikuchi, Tochigi, Japan

[73] Assignee: Kabushiki Kaisha Toshiba, Kawasaki, Japan

[21] Appl. No.: 914,664

[22] Filed: Oct. 2, 1986

[30] Foreign Application Priority Data

Oct. 3, 1985 [JP] Japan .................. 60-219075

[51] Int. Cl.$^4$ .............................................. A61B 1/04
[52] U.S. Cl. ......................................... 358/98; 128/4; 358/160; 358/183
[58] Field of Search ................. 358/98, 140, 183, 160; 128/4, 6

[56] References Cited

U.S. PATENT DOCUMENTS 3,641,266  2/1972  Stults ................................... 358/105
4,654,701  3/1987  Yabe .................................... 358/183

Primary Examiner—Howard W. Britton
Attorney, Agent, or Firm—Schwartz, Jeffery, Schwaab, Mack, Blumenthal & Evans

[57] ABSTRACT

An endoscopic apparatus according to the present invention includes an image pickup optical system, a solid state image pickup element for converting an optical image of an object formed by said optical system to electrical signals, a television circuit unit for converting the output signal from said solid state image pickup element to a video signal, memory for memorizing the video signal from said television circuit unit, a push-button switch for supplying a freeze command signal to display the video signal under frozen condition, display for displaying a real image and/or a frozen image, and a memory controller for controlling writing and reading for the memory to display both of the real image and the frozen image on the display when a freeze command signal is supplied from said freeze command signal supply means, and to display the real image alone when no freeze command signal is supplied. Therefore the real image is displayed in the display all the time irrespective of the presence or absence of the freeze command signal.

16 Claims, 8 Drawing Figures

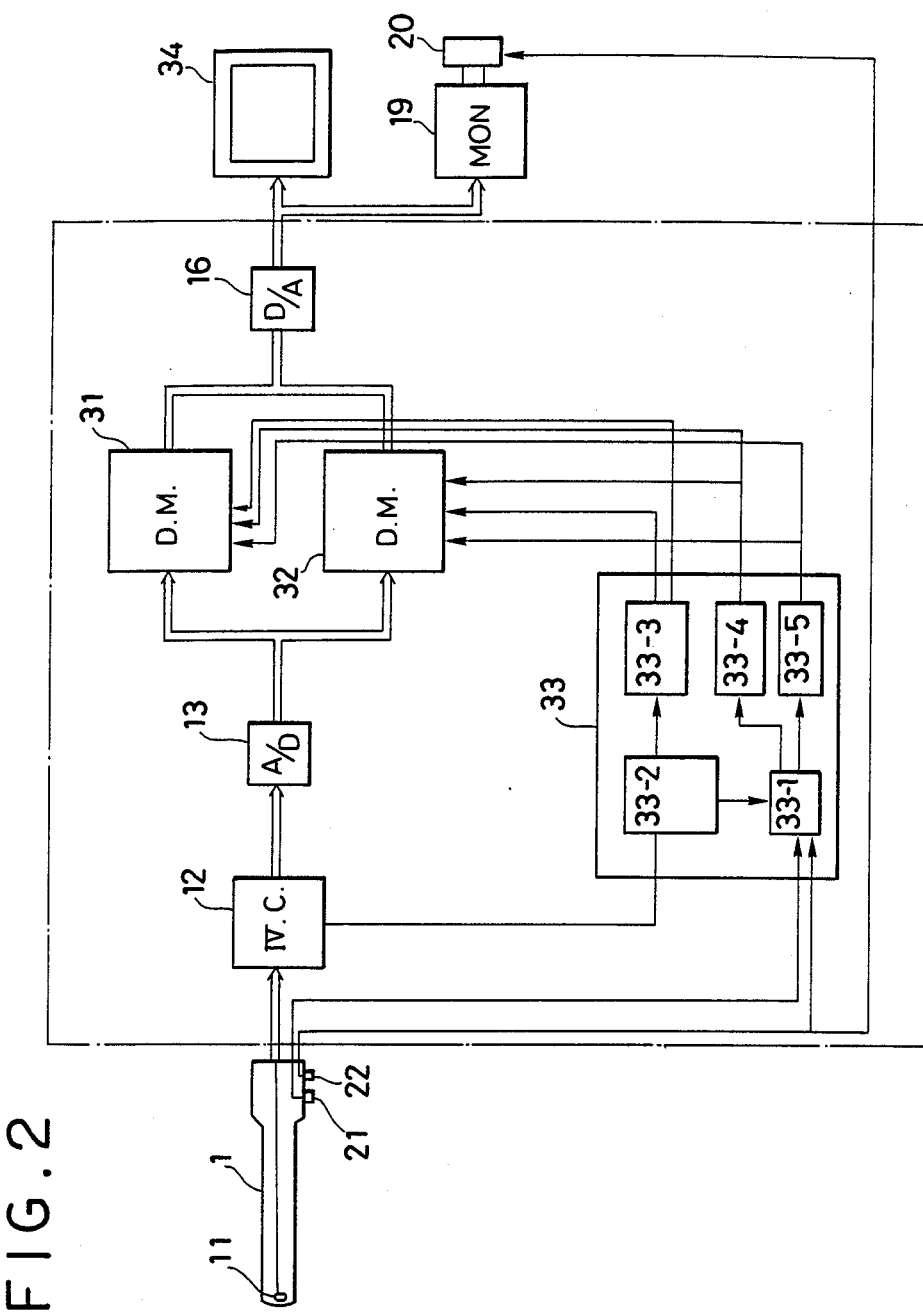

NORMAL CONDITION

AT FREEZING

AT PHOTOGRAPHING

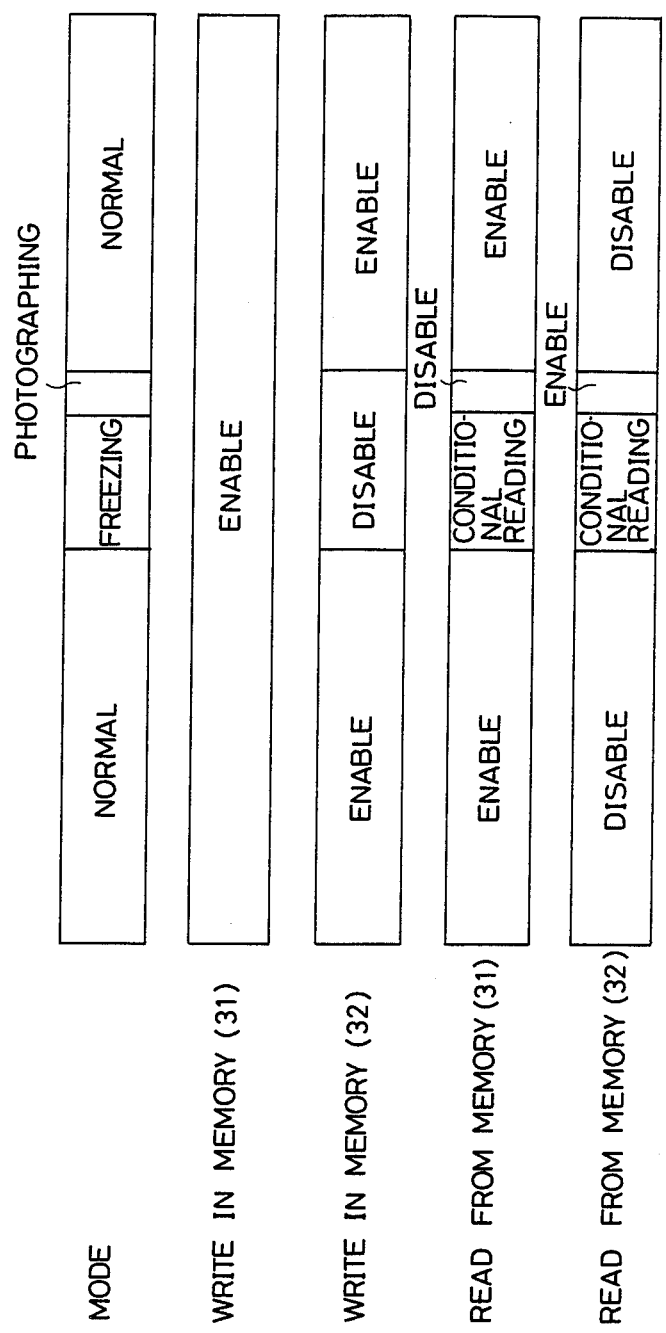

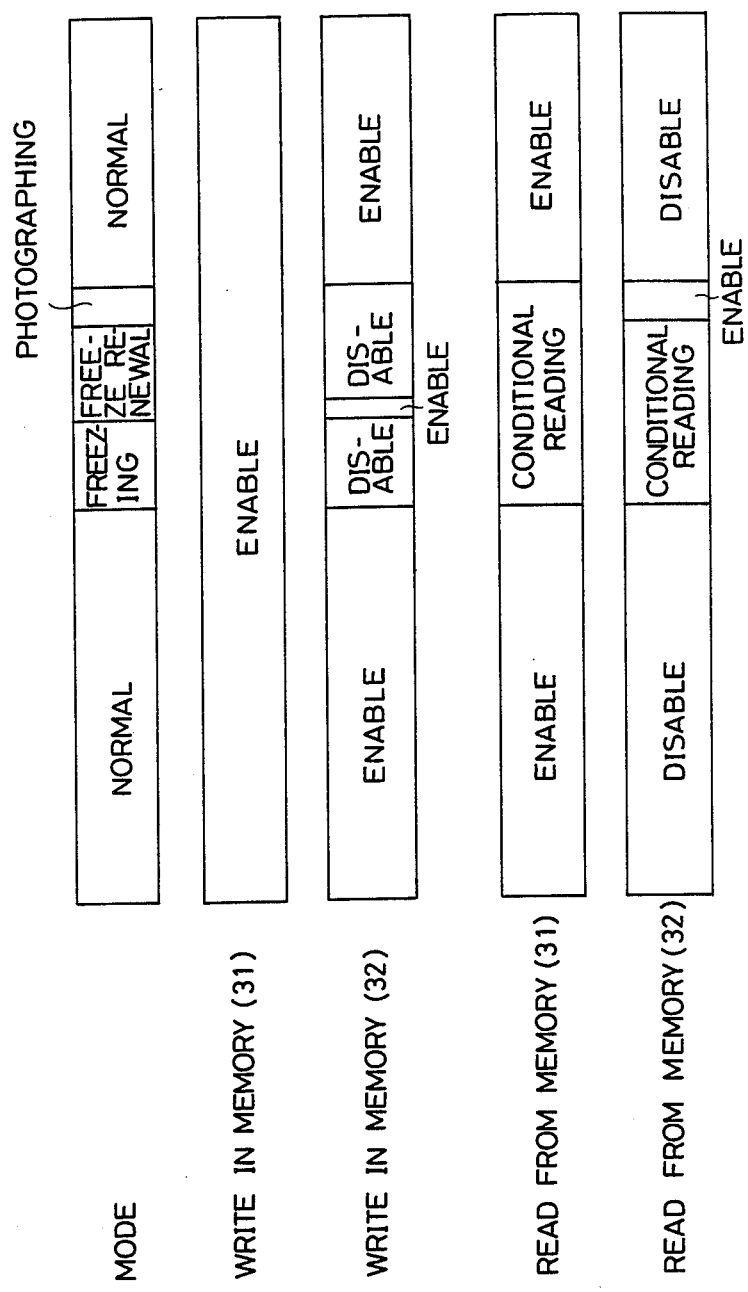

ENDOSCOPIC APPARATUS

BACKGROUND OF THE INVENTION

1. Field of the Invention

The present invention relates to an endoscope which uses a solid state image pickup element, and more particularly to an endoscope which is capable of displaying the real image that is changing continuously, even during the time when in diagnosis an image is frozen and the frozen image is projected for photographing.

2. Description of the Prior Art

In making an observation and taking a record of the inside of a cavity of a living body, the interior of a mechanical device, or the like, use has been made of an endoscope called a fiberscope in the past.

In recent years, development has been under way for an endoscope that has a miniature solid state image pickup element arranged on the tip, represented by charge coupled device (CCD) and the like.

In an endoscope of the above kind, image fiber that is used in the conventional fiberscope is replaced by a solid state image pickup element that converts the optical image of an object to electrical signals. Ordinarily, the electrical signals are displayed as an image on a display unit such as a CRT monitor via a processing circuit that converts the electrical signals to the television signals. By applying such a new technology to the endoscope, the resolving power (number of the picture elements) that used to be determined in the past by the number (several tens of thousand) of the fibers used will now be determined by the number of the picture elements on the light-receiving surface of CCD. Therefore, it becomes possible now to obtain a resolving power which is about two to three times as high that of the fiber type endoscope. Further, it needs only to insert an electrical signal line to the endoscope probe without requiring several tens of thousand of fibers, so that it becomes possible to reduce the diameter of the probe and has an effect of alleviating the pain to the patient.

Now, some of the endoscopes of the above kind have a freezing function for displaying an image by halting it. Namely, the purpose for having a freezing function which is employed in endoscopic diagnosis for recording an image by taking a photograph or a similar method, is to avoid the blurring in the photographed image which is caused by the movement of the image, if the change in time of the object image on the monitor is wild. For freezing the image, use is made of an image memory, and by an operation at an arbitrary timing of a switch or the like by the technician, instantaneous images are stored in the image memory.

The stored image is projected on the monitor to judge whether or not it is adequate for photographing, and the image is photographed with a Polaroid camera or the like if it is considered adequate.

In the prior-art device, however, for the period of diagnosis during which an image is frozen and the frozen image is photographed by projecting it on the monitor, the continuous presentation of the real image that changes with time is interrupted temporarily. Thus, for instance, in a medical care in which a polyp (disease affected area) is excised by using a pair of forcipes, at the instant of the excision, the operation is ordinarily performed by freezing the image. However, the operation used to be extremely precarious because of the unknown whereabouts of the pair of forcipes at the time of the operation.

SUMMARY OF THE INVENTION

The object of the present invention is to provide an endoscopic apparatus which permits to perform with confidence diagnosis and medical care, by making it possible to observe without interruption the state of affairs within the body cavity even during the period of photographing the image.

A feature of the present invention resides in that the endoscopic apparatus is equipped with (a) an image pickup optical system; a solid state image pickup element that converts the optical image of an object that is formed by the optical system to electrical signals, (b) a television circuit which converts the output signal from the solid state image pickup element to a video signal, (c) a memory which memorizes the video signal from the television circuit, (d) a switch which supplies freeze command signal for displaying the video signal under frozen condition, (e) a first television monitor connected to the television circuit for displaying the video signal from the television circuit as a real image, and a second television monitor connected to the memory for displaying the video signal of the frozen image from the memory, only when a freeze command signal is generated, and (f) a memory controller which controls so as to write successively and read successively the video signal from the television circuit to the memory when there is not supplied a freeze command signal, and controls so as to interrupt writing at the point in time when a freeze command signal is supplied, and read the frozen image signal, when there is supplied a freeze command signal.

Another feature of the present invention resides in that the endoscopic apparatus is equipped with (a) an image pickup optical system; a solid state image pickup element that converts the optical image of an object that is formed by the optical system to electrical signals, (b) a television circuit which converts the output signal from the solid state image pickup element to a video signal (c) a first memory for recording and reproducing real images and a second memory for recording and reproducing frozen images, (d) a switch for supplying a freeze command signal for displaying the video signal under frozen condition, (e) a first television monitor for displaying a frozen image and a real image, or a real image alone, by video signals from the first and the second memories, and (f) a memory controller which controls so as to write successively and read successively video signals from the television circuit to the first memory, when a freeze command signal is supplied, and interrupts the writing of the video signal to the second memory at the point in time when a freeze command signal is supplied, to control so as to read the real image signal and the frozen image signal from the first and second memories to display simultaneously the real image and the frozen image on the television monitor.

These and other objects, features and advantages of the present invention will be more apparent from the following description of the preferred embodiments, taken in conjunction with the accompanying drawings.

BRIEF DESCRIPTION OF THE DRAWINGS

FIG. 2 is a block diagram for a second embodiment of the endoscopic apparatus in accordance with the present invention;

FIG. 4 illustrates the time charts that show the states of the digital memory in the second embodiment shown in FIG. 2;

FIG. 6 illustrates the time charts that show the states of the digital memory in the third embodiment shown in FIG. 5.

DESCRIPTION OF THE PREFERRED EMBODIMENTS

Figure 1:
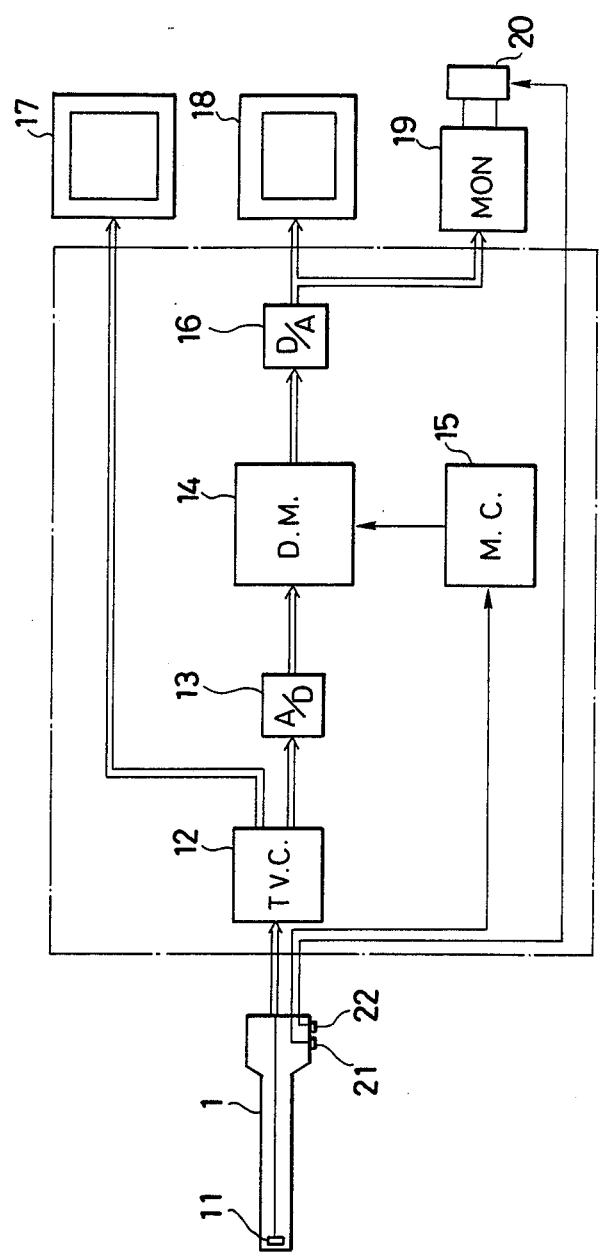
FIG. 1 is a block diagram for a first embodiment of the endoscopic apparatus in accordance with the present invention.

Referring to FIG. 1, there is shown a first embodiment of the endoscopic apparatus in accordance with the present invention.

The endoscopic apparatus comprises an endoscopic probe 1 which has a solid state image pickup element 11 such as CCD image sensor as the tip component, a television circuit unit T.V.C. 12 which forms a video signal based on the output signal from the solid state image pickup element, an A/D converter 13 which digitizes the video signal which is output from the television circuit unit 12 into a digital signal, a digital memory D.M. 14, a memory control unit M.C. 15 for the digital memory, a D/A converter 16 which converts the output of the digital memory 14 into an analog signal, a television monitor 17 which displays directly the video signal which is output from the television circuit 12, a television monitor 18 which displays the video signal output from the D/A converter 16, a television monitor 19 for photographing, and a camera 20 which takes the photograph of the video on the film. On the endoscopic probe 1, there are provided a push-button switch for freezing 21 and a push-button switch for shutter 22 of the camera 20 for photographing a frozen image which are connected respectively to the memory control unit 15 and the camera 20.

Next, the operation of the present embodiment with the above construction will be described.

The solid state image pickup element 11 converts the optical image of the body cavity illuminated by a light source which is not shown into electrical signals.

The electrical signal is converted into video signal by the television circuit 12, and it is displayed on the one hand on the television monitor 17 as it is. On the other hand, it is digitized by the A/D converter 13 and is recorded successively in the digital memory 14. After the recorded image data are read out and converted to analog signals successively, they are displayed on the television monitor 18 and the monitor for photographing 19.

When an image of the body cavity in question is confirmed by the television monitor 17 or 18, the technician can obtain a frozen image by pressing the push-button switch 21. Namely, when the push-button switch 21 is pressed, then under the action of its signal, the memory controller 15 reads repeatedly the image in the memory 14 by fixing the image. As a result, a frozen image is displayed on the television monitors 18 and 19.

Next, by pressing the push-button switch for shutter 22, the technician can take a photograph of the frozen image that is displayed on the television monitor 19 by using the camera 20.

To release the frozen image, it is constructed that just one more pressing of the push-button switch 21 will achieve what is desired.

Accordingly, with the above construction, it is possible to observe on the television monitor 17 the real image that shows the state of affairs within the body cavity, even during the freezing and photographing of the image.

Referring to FIG. 2, a second embodiment of the endoscopic apparatus in accordance with the present invention is shown. Here, the like components as in FIG. 1 will be given identical numerals to omit their description.

This embodiment is constructed in such a way as to display both of a frozen image and a real image on one television monitor 34. Namely, in the embodiment, in place of the digital memory 14 and the memory control unit 15 in the first embodiment, there are provided a digital memory 31 for recording and reproducing the real image, a digital memory 32 for recording and reproducing the frozen image, and a memory control 33 for controlling the digital memories 31 and 32. The memory control 33 consists of a trigger generation unit 33-1, a television synchronizing signal generation unit 33-2, a memory address generation unit 33-3, a memory write control unit 33-4, and a memory read control unit 33-5. The trigger generation unit 33-1 generates a signal of predetermined mode upon receipt of a turning-on signal from the push-button switches 21 and 22. Upon receipt of the signal of the above mode, the memory write control unit 33-4 and the memory read control unit 33-5 send predetermined write and read control signals to the memories 31 and 32, respectively. The television synchronizing signal generation unit 33-2 is a unit for generating horizontal and vertical synchronizing signals and others, and sends synchronizing signals to each of T.V.C. 12, the trigger generation unit 33-1, and the memory address generation unit 33-3. The memory address generation unit 33-3 sends address signals for executing write and read of the predetermined data, in synchronization with the television synchronizing signal.

Figure 5:
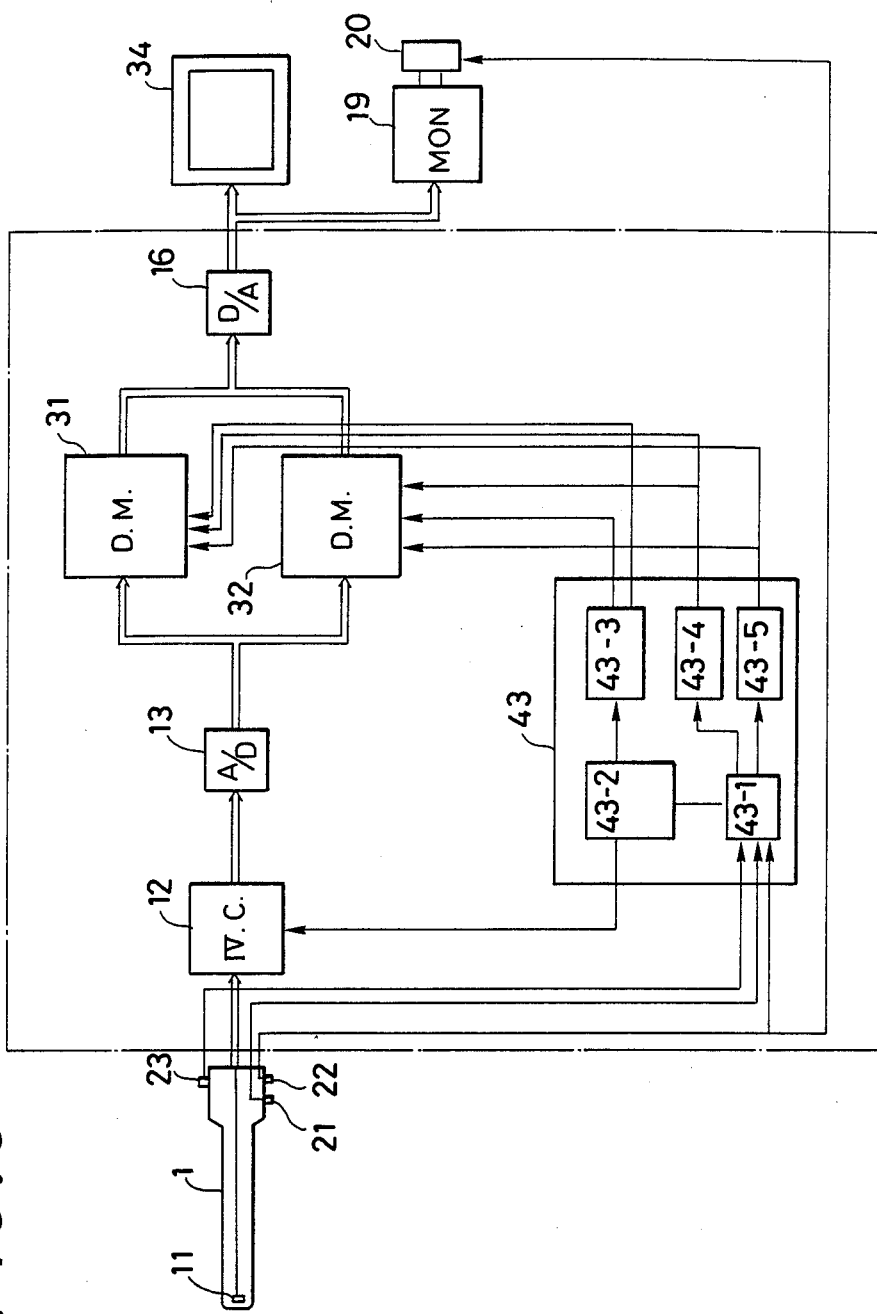
FIG. 5 is a block diagram for a third embodiment of the endoscopic apparatus in accordance with the present invention.

Next, referring to FIGS. 4 and 5, the operation of the second embodiment will be described.

Figure 3A:
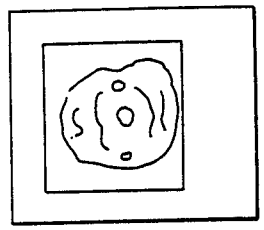
FIGS. 3A to 3C are explanatory views for illustrating the display conditions of the television monitor for the second embodiment shown in FIG. 2.

When the freeze selection push-button switch 21 is not pressed, the trigger generation unit 33-1 ordinarily transfers the real mode signal to the memory write control unit 33-4 and the memory read control unit 33-5. Upon receipt of the real mode signal, the memory write control unit 33-4 let the digital memory 33 successively memorize the real image, and the memory write control unit 33-5 reads successively the real image that was stored in the digital memory 31 and sends it to the television monitor 34 as real image information. On the television monitor 34, there is displayed a real image as shown in FIG. 3A. The technician seeks the desired image while observing the real image. When the desired image is confirmed and the freeze selection push-button switch 21 in FIG. 2 is pressed, the turn-on signal from the switch 21 is sent to the trigger generation unit 33-1 of the memory controller 33.

Figure 3B:
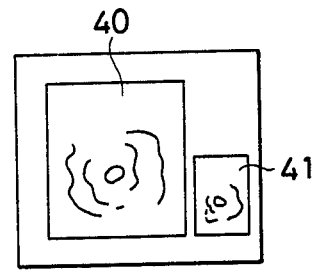
Figure 3C:
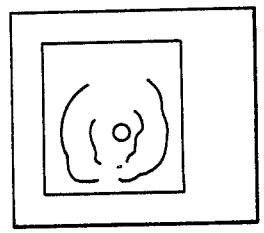

The trigger generation unit 33-1 sends the freeze mode signal to the memory write control unit 33-4 and the memory read control unit 33-5. Upon receipt of the freeze mode signal, the memory write control unit 33-4 let the digital memory 31 memorize successively the real image and let the other digital memory 32 to memorize the frozen image. The memory read control unit 33-5 controls the addresses of the digital memories 31 and 32 so as to display the frozen image 40 and the real image 41 simultaneously on the television monitor 34, as shown in FIG. 3B.

Namely, when the freeze mode is selected, by the operation of the switch 21, the address signal output from the memory read control unit 33-5 is supplied to each of the digital memories 31 and 32 by selective turning on and off. For example, when a real image 41 is displayed in small size on one side of a frozen image 40 as shown in FIG. 3B, the address signal from the memory read control unit 33-5 is supplied only to the digital memory 32 side, and the area on both ends in the horizontal direction where there is not contained any sensitivity information is output without being read. The signal is supplied via the D/A converter 16 to the television monitor 34 and the television monitor for photographing 19. When the display proceeds successively until about one half of the vertical length of the television monitor, the address signal begins to be supplied also to the digital memory 31 side where the real image is recorded. In the latter half of each of the horizontal scanning lines, the real image from the digital memory 31, instead of the digital memory 33, is supplied to the television monitors 34 and 19 via the D/A converter 16 by thinning out the predetermined pixel number (for example, 4 pixels). (Conditional read-out.) When one field is completed in the above manner, a frozen image 40 and a real image 41 are displayed on the television monitor 34, as shown in FIG. 3B. Then, the technician presses the push-button switch 22, when he judges that photographing is appropriate by observing the television monitor 34. By so doing, the memory read control unit 33-4 supplies address output only to the digital memory 32, displaying a frozen image on the television monitor 34 and 19, and photographing by the camera 20 is executed. In addition, it returns to its original condition immediately after the completion of photographing, the memory controller 33 supplies the address output to the digital memory 31 alone, and displays the real image alone to be offered for observation until the next freeze signal comes in.

Namely, in the second embodiment, it is possible to observe the real image on one unit of television monitor even at the time of freezing the image, so that no danger will exist for the examinee.

Next, by referring to FIG. 5, a third embodiment of the present invention will be described.

In the figure, like components as in the first embodiment will be given identical numerals and their description will be omitted. Therefore, after the push-button switch for freeze renewal is pressed, there are displayed the real image and the frozen image on the television monitor 34. Other configuration and operation are analogous to the second embodiment so that further description will be omitted.

As in the foregoing, embodiments of the present invention have been described. However, the present invention is not limited to the above embodiments, and various modifications can be made without departing from the scope thereof.

In summary, according to the present invention, it is possible to observe the situation within a body cavity even when the image is frozen for photographing during the diagnosis and the medical care by the use of the endoscope, so that it is possible to carry out endoscopic inspection with safety.

What is claimed is:

1. An endoscopic apparatus, comprising:
   (a) an image pickup optical system;
   (b) a solid state image pickup element for converting an optical image of an object formed by said optical system to electrical signals;
   (c) a television circuit unit for converting the output signal from said solid state image pickup element to a video signal;
   (d) memory means for memorizing the video signal from said television circuit unit;
   (e) means for supplying a freeze command signal to display the video signal under frozen condition;
   (f) display means for displaying a real image and/or a frozen image; and
   (g) a memory controller for controlling writing and reading for said memory means to display both of the real image and the frozen image on said display means when a freeze command signal is supplied from said freeze command signal supply means, and to display the real image alone when no freeze command signal is supplied, whereby the real image is displayed in said display means all the time irrespective of the presence or absence of the freeze command signal.

2. The endoscopic apparatus as claimed in claim 1, wherein said freeze command signal supply means comprises a push-button switch.

3. The endoscopic apparatus as claimed in claim 1, wherein said display means comprises a first television monitor connected to said television circuit unit for displaying the video signal from said television circuit unit as a real image, and a second television monitor that is connected to said memory means for displaying a video signal for frozen image from said memory means only when a freeze command signal is supplied.

4. The endoscopic apparatus as claimed in claim 3, wherein said memory means comprises one digital memory, and an A/D converter being provided between the digital memory and said television circuit, and a D/A converter being provided between the digital memory and the second television monitor.

5. The endoscopic apparatus as claimed in claim 3, wherein said memory controller controls, when no freeze command signal is supplied, so as to write successively and read successively the video signal from said television circuit unit to said memory means, and controls, when a freeze command signal is supplied, so as to interrupt to write at the point in time when a freeze command signal is supplied, and read the frozen image signal.

6. The endoscopic apparatus as claimed in claim 5, further comprising:
   a third television monitor for displaying frozen image signals for photographing from said memory means; and
   a camera attached to the third television monitor to photograph the frozen image.

7. The endoscopic apparatus as claimed in claim 1, wherein said display means comprises a first television monitor for displaying a frozen image and a real image, or a real image alone, by a video signal from said memory means.

8. The endoscopic apparatus as claimed in claim 7, wherein said memory means comprises a first digital memory for recording and reproducing a real image and a second digital memory for recording and reproducing a frozen image, and an A/D converter being provided between the television circuit unit and the first and the second digital memories, and a D/A converter being provided between the first television monitor and the first and the second digital memories.

9. The endoscopic apparatus as claimed in claim 8, further comprising:
 a second television monitor for displaying a frozen image for photographing from the second digital memory; and
 a camera attached to the second television monitor to photograph the frozen image.

10. The endoscopic apparatus as claimed in claim 8, further comprising:
 means for supplying a renewal command signal to said memory controller for renewing the frozen image memorized in the second digital memory, said memory controller being constructed for controlling so as to renew the frozen image memorized in the second digital memory, in accordance with the renewal command signal.

11. The endoscopic apparatus as claimed in claim 10, wherein the renewal command supply means comprises a freeze renewal push-button switch.

12. The endoscopic apparatus as claimed in claim 8, wherein said memory controller controls, when no freeze command signal is supplied, so as to write successively and read successively the video signal from said television circuit unit to the first digital memory, and controls, when a freeze command signal is supplied, so as to write successively the video signal into the first digital memory, and said memory controller further controls to interrupt to write the video signal in the second digital memory at the point in time when the freeze command signal is supplied, to read the real image signal and the frozen image signal from the first and the second digital memories in order to display simultaneously the real image and the frozen image on the television monitor.

13. The endoscopic apparatus as claimed in claim 12, wherein said memory controller selectively supplies the address signal to each of the first and second digital memories in order to display simultaneously the real image and the frozen image on the television monitor.

14. The endoscopic apparatus as claimed in claim 13, wherein said memory controller comprises a trigger generation unit, a television synchronizing signal generation unit, a memory address generation unit, a memory write control unit, and a memory read control unit.

15. An endoscopic apparatus, comprising:
 (a) an image pickup optical system;
 (b) a solid state image pickup element for converting an optical image of an object formed by said optical system;
 (c) a television circuit unit for converting the output signal from said solid state image pickup element to a video signal;
 (d) a memory for memorizing the video signal from said television circuit unit;
 (e) a switch for supplying a freeze command signal to display the video signal under frozen condition;
 (f) a first television monitor connected to said television circuit unit to display the video signals from said television circuit unit as a real image;
 (g) a second television monitor connected to said memory for displaying the video signal of the frozen image from said memory only when a freeze command signal is supplied; and
 (h) a memory controller for controlling, when the freeze command signal is not supplied, so as to write successively and read successively the video signal from said television circuit unit for said memory, and controlling, when the freeze command signal is supplied, so as to interrupt the writing at the point in time when the freeze command signal is supplied, and read the frozen video image signal.

16. An endoscopic apparatus, comprising:
 (a) an image pickup optical system;
 (b) a solid state image pickup element for converting an optical image of an object formed by said optical system to electrical signals;
 (c) a television circuit unit for converting the output signal from said solid state image pickup element to a video signal;
 (d) a first memory for recording and reproducing a real image;
 (e) a second memory for reconding and reproducing a frozen image;
 (f) a switch for supplying a freeze command signal to cause the video signal to be displayed in frozen conditions;
 (g) a first television monitor for displaying a frozen image and a real image, or a real image alone, by a video signal from the first and the second memories; and
 (h) a memory controller for controlling, when a freeze command signalis not supplied, so as to write successively and read successively the video signal from said television circuit unit into the first memory, and for controlling, when the freeze command signal is supplied, so as to write successively the video signal in the first memory, and also to interrupt the writing of the video signal in the second memory at the point in time when the freeze command signal is supplied, to read the real image signal and the frozen image signal from the first and the second memories in order to display simultaneously a real image and a frozen image on the television monitor.

* * * * *